United States Patent [19]
Musha

[11] Patent Number: 4,644,516
[45] Date of Patent: Feb. 17, 1987

[54] OPTICAL HEAD
[75] Inventor: Tohru Musha, Tokyo, Japan
[73] Assignee: Olympus Optical Co., Ltd., Tokyo, Japan
[21] Appl. No.: 603,299
[22] Filed: Apr. 24, 1984
[30] Foreign Application Priority Data
  Apr. 28, 1983 [JP] Japan ................ 55-73846
[51] Int. Cl.⁴ ................................ G11B 7/00
[52] U.S. Cl. ...................... 369/43; 369/45; 369/46; 250/201
[58] Field of Search ............... 358/342; 250/201 DF, 250/204; 369/43, 44, 45, 46
[56] References Cited
  U.S. PATENT DOCUMENTS
  4,422,168  12/1983  Ito et al. .................. 369/45
  4,425,636   1/1984  Musha et al. ............ 369/45 X
  4,455,085   6/1984  Kato et al. ............... 369/45 X
  4,505,584   3/1985  Kato et al. ............... 369/45 X Primary Examiner—Robert L. Richardson
Attorney, Agent, or Firm—Parkhurst & Oliff

[57] ABSTRACT

An optical head for reading a signal recorded along spiral or concentric tracks on an optical disc including a semiconductor laser for emitting a linearly polarized light beam, a polarization prism for transmitting the light beam, an objective lens for projecting the light beam upon the optical disc and for collecting a light beam reflected by the optical disc, a critical angle prism for totally reflecting the light beam reflected by the polarization prism and a light detector for receiving the light beam totally reflected by an optical surface of the critical angle prism. The polarization prism and critical angle prism are integrally coupled with each other to form an assembly of prisms which is rotated to adjust an incident angle of the light beam impinging upon the optical surface of critical angle prism substantially at a critical angle of total reflection.

11 Claims, 13 Drawing Figures

OPTICAL HEAD

BACKGROUND OF THE INVENTION

The present invention relates to an optical head for recording and/or reproducing a signal on and/or from optical disc type record mediums such as the audio disc, video disc and data disc.

Heretofore, various types of optical heads have been proposed. In such optical heads, a light beam emitted from a light source such as a laser light source is focused onto an optical disc as a fine light spot. In order to effect the recording and reproducing accurately, it is required to correct the mutual displacement between the light spot and a track on the optical disc, i.e. a focusing error and a tracking error.

Figure 1:
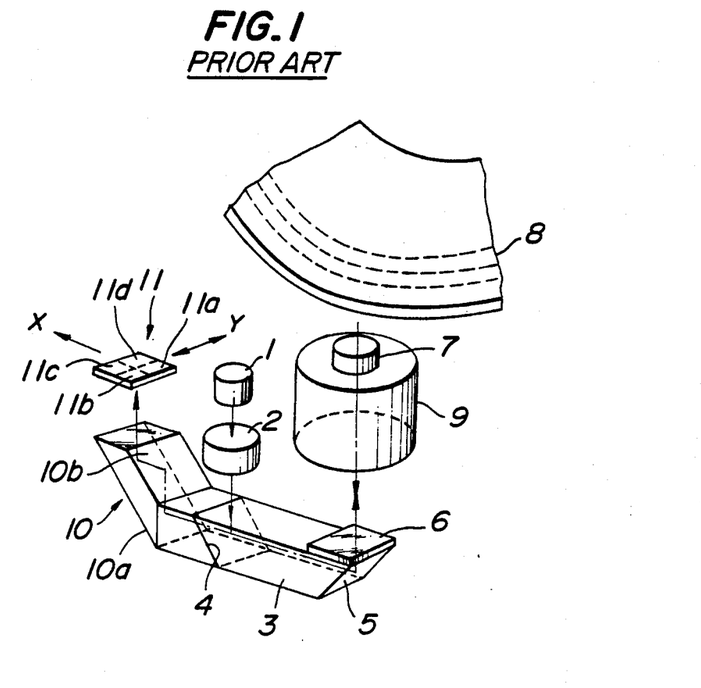
FIG. 1 is a perspective view showing a known optical head.

FIG. 1 illustrates an example of a known optical head in which a focusing error signal is detected by utilizing the critical angle of total reflection. A linearly polarized light beam emitted from a semiconductor laser 1 is converted by a collimator lens 2 into a parallel light flux and then is made incident upon a polarization prism 3. A light flux reflected by a polarizing film 4 of the prism 3 is further reflected by a reflection surface 5 and is made incident upon an objective lens 7 via a quarter wavelength plate 6. The light flux is focused onto an optical disc 8 as a fine light spot having a diameter of about 1 $\mu$m. The objective lens 7 is supported by an objective lens actuator 9 movable in two orthogonal directions, i.e. the direction of the optical axis of the objective lens and the radial direction of the optical disc 8 perpendicular to the optical axis. To this end, the actuator 9 comprises a magnet, a yoke and a coil. By means of the actuator 9, the objective lens 7 is driven in the two directions to effect the so-called focus servo and radial servo so that the light spot is always focused at the center of the track in the optical disc 8. A light flux reflected by the optical disc 8 is returned to the polarizing film 4. Due to the function of the quarter wavelength plate 6, the polarization direction of the return light flux is made perpendicular to that of the incident light flux to the prism 3 and thus, the reflected light flux is transmitted through the polarizing film 4 and is made incident upon a light detector 11 via a critical angle prism 10.

The critical angle prism 10 comprises a pair of parallel optical surfaces 10a and 10b which are set so that incident angle of the optical axis of the light flux reflected from the optical disc 8 is made substantially equal to the critical angle of total reflection. The return light flux is reflected three times between these optical surfaces to enhance the sensitivity of detecting the focusing error. Then, the light flux is made incident upon the light detector 11. The light detector 11 comprises four light receiving regions 11a to 11d divided in the radial direction Y as well as the tangential direction X of the optical disc 8. By suitably processing output signals from the regions 11a to 11d, there are obtained focusing and tracking error signals.

Figure 2A:
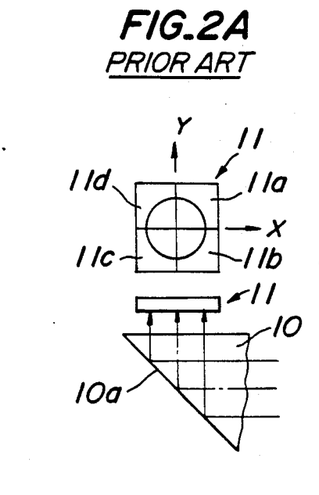
FIGS. 2A, 2B and 2C are schematic views for explaining how to obtain a focusing error signal by means of the critical angle of total reflection.
Figure 2B:
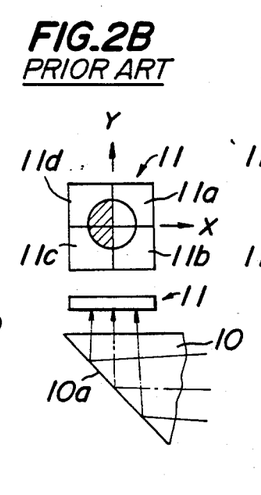
Figure 2C:
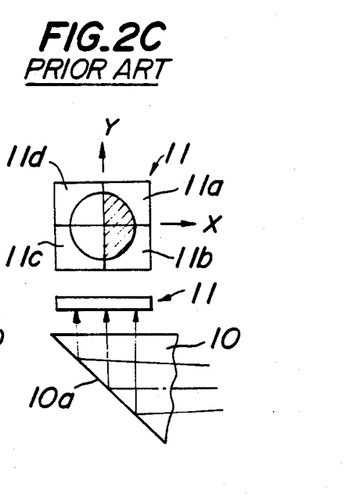

In the known optical head shown in FIG. 1, when the objective lens 7 is situated at a focus position with respect to the optical disc 8, the parallel return light flux is made incident upon the critical angle prism 10 as illustrated in FIG. 2A and thus all light rays in the light flux are made incident upon the optical surfaces 10a and 10b substantially at the critical angle. Therefore, all the light rays are totally reflected by the optical surfaces 10a and 10b and are made incident upon the light receiving regions 11a to 11d uniformly. Contrary to this, when the objective lens 7 is out of focus, the converging or diverging light flux is made incident upon the prism 10 as depicted in FIGS. 2B and 2C, respectively. Then, the return light rays are made incident upon the optical surfaces of prism 10 at angles smaller or larger than the critical angle with respect to a plane including the optical axis and being perpendicular to the incident plane. Therefore, a dark and bright pattern is formed on the light detector 11 viewed in the tangential direction X. The dark and bright pattern formed on the light detector 11 are opposite to each other for the converging and diverging light fluxes as illustrated in FIGS. 2B and 2C. Therefore, it is possible to obtain a focusing error signal from $(a+b)-(c+d)$, wherein a, b, c and d are output signals from the light receiving regions 11a, 11b, 11c and 11d, respectively. A radial error signal, i.e. tracking error signal may be obtained from $(a+c)-(b+d)$ and a data signal may be derived from $(a+b+c+d)$.

In the optical head illustrated in FIG. 1, in order to obtain good optical properties, the following conditions have to be satisfied.

(1) The light beam emitted from the semiconductor laser 1 is an elliptic beam and is linearly polarized in the minor axis direction and in order to increase MTF, the minor axis of the elliptic beam impinging upon the objective lens 7 should be aligned in the tangential direction X.

(2) In order to increase the sensitivity of the focusing error detection, P polarized light should be made incident upon the critical angle prism 10.

(3) In order to avoid the influence of push-pull noise due to pits on the optical disc upon the focusing error signal, the incident plane to the optical surfaces 10a and 10b of the prism 10 should be aligned in the tangential direction X.

(4) The optical surfaces 10a and 10b of the prism 10 should be adjusted accurately with respect to the optical axis of the incident light flux reflected from the optical disc 8 within ±10 seconds.

Figure 3:
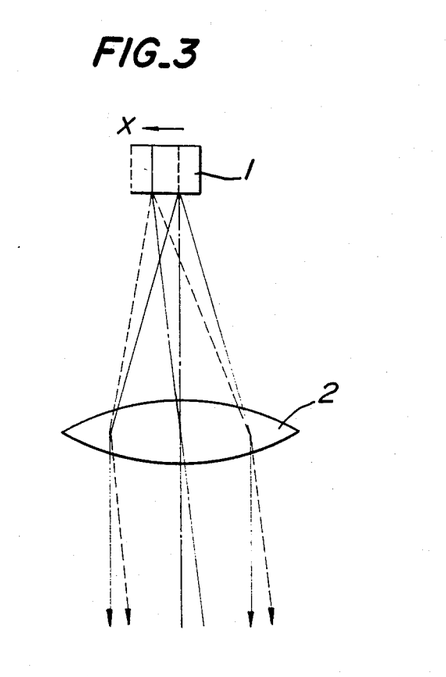
FIG. 3 depicts a side view of the collimator lens 2.

The first three requirements (1) to (3) can be easily satisfied. As for the fourth requirement, in the known optical head, the semiconductor laser 1 is moved in the tangential direction X so as to incline the light flux emanating from the collimator lens 2 as illustrated in FIG. 3. However, in such an optical head, it is extremely difficult to move the light emitting point of the laser only in the tangential direction X and thus, the angle adjustment requires a very long time even for experienced persons. In order to avoid such a drawback, it may be conceived that only the critical angle prism 10 is rotated about an axis perpendicular to the incident plane to the optical surfaces 10a and 10b of prism 10. However, in this case, since the prism 10 has to be arranged separately from the polarization prism 3, it is impossible to precisely keep the desired adjustment under temperature variations.

Figure 4:
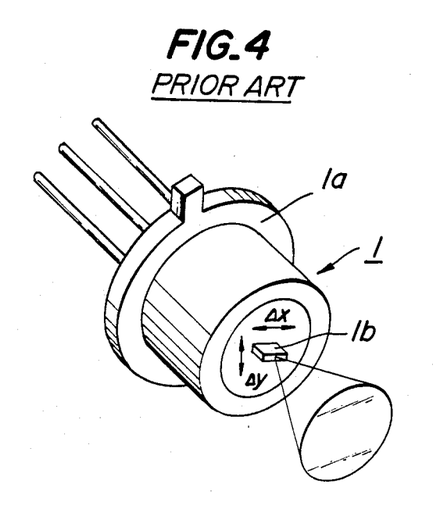
FIG. 4 is a perspective view illustrating a semiconductor laser for use in the optical head.

As shown in FIG. 4, the semiconductor laser 1 comprises a package 1a and LD chip 1b and dimensions of the package 1a have been normalized. That is, the LD chip 1b is precisely positioned with respect to the package 1a within ±50 $\mu$m in both directions $\Delta x$ and $\Delta y$. Therefore, it is preferable that the semiconductor laser 1 be free from adjustment, when considering the adjustment of the whole optical head.

SUMMARY OF THE INVENTION

The present invention has for its object to provide a novel and useful optical head in which an incident angle to an optical surface of the critical angle prism can be adjusted precisely and easily without moving the light source.

It is another object of the invention to provide an optical head in which the required accuracy of the angle adjustment of the prism can be maintained for a long time without being influenced by temperature variations.

It is another object of the invention to provide an optical head in which the angle adjustment of the prism can be carried out using a simple construction.

It is still another object of the invention to provide an optical head which is small in size, particularly in the optical direction of the objective lens and in the radial direction.

According to the invention, an optical head for recording and/or reproducing a signal on and/or from an optical record medium, comprises:

a light source for emitting a light beam;
a beam splitter for splitting the light beam into a transmitted light beam and a reflected light beam;
an objective lens for projecting the transmitted or reflected light beam onto the record medium as a fine light spot and for directing the light beam reflected by the record medium toward said beam splitter;
a prism integrally coupled with said beam splitter and having an optical surface upon which the light beam reflected from or transmitted through the beam splitter is made incident substantially at the critical angle of total reflection;
means for supporting an assembly of the beam splitter and prism rotatably about an axis such that the incident angle of the light beam to the optical surface of the prism is adjustable; and
a light detector arranged to receive a light beam totally reflected by the optical surface of prism.

DESCRIPTION OF THE PREFERRED EMBODIMENTS

Figure 5:
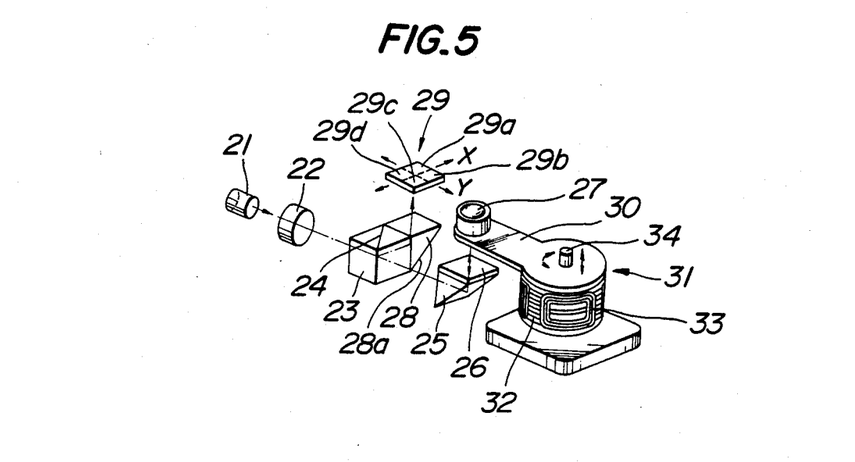
FIG. 5 is a perspective view depicting an embodiment of the optical head according to the invention.

FIG. 5 is a perspective view showing the arrangement of the main parts of an embodiment of the optical head according to the invention. A linearly polarized light beam emitted from a semiconductor laser 21 is converted into a parallel beam by means of a collimator lens 22 and the parallel light beam is made incident upon a polarization prism 23 serving as a beam splitter. The light beam is transmitted through a polarization film 24 of the prism 23, is reflected upward by a reflection prism 25 and then is made incident upon an objective lens 27 via a quarter wavelength plate 26. In this case, a major axis of an elliptic light beam is aligned to a tangential direction X. The light beam is focused by the objective lens 27 onto a record medium, i.e. an optical disc, as a fine light spot. A light flux reflected by the optical disc is collected by the objective lens 27 and is made incident upon the polarizing film 24 as a return light flux. The return light flux has been transmitted through the quarter wavelength plate 26 twice, it is totally reflected by the polarizing film 24 toward a critical angle prism 28. The return light flux is reflected by an optical surface 28a of the prism 28 and then is made incident upon a light detector 29 having four light receiving regions 29a to 29d divided in the orthogonal disc radial direction Y and the tangential direction X. From output signals of the light receiving regions 29a to 29d, there are obtained data signal, focusing error signal and radial error signal in the same manner as that explained with reference to FIG. 1.

Figure 6:
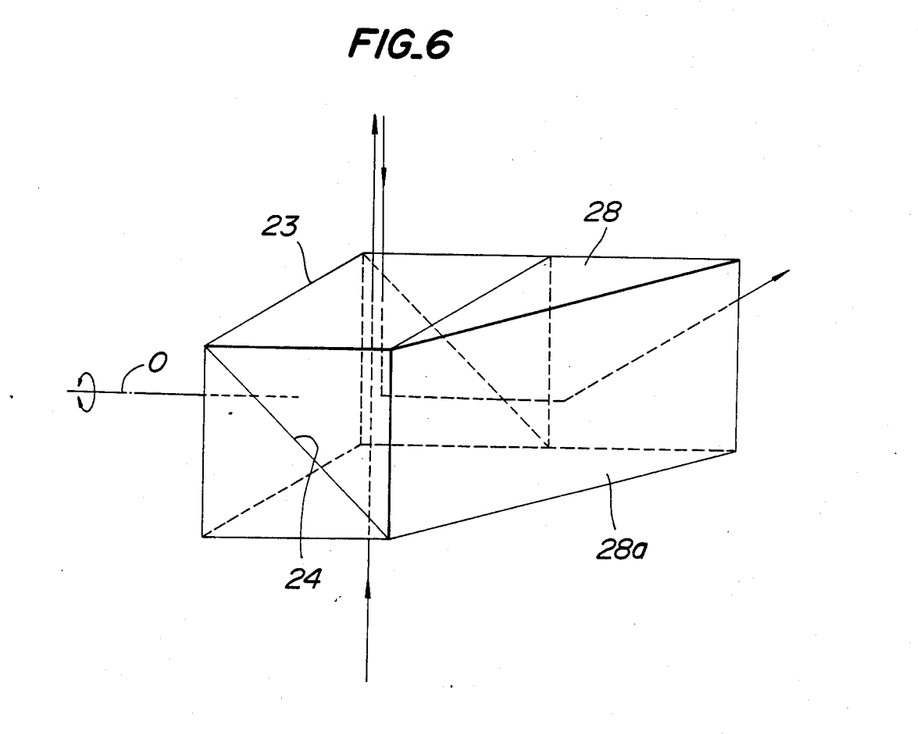
FIG. 6 is a perspective view showing a part of the optical head of FIG. 5.

The optical surface 28a of the critical angle prism 28 is set so that an optical axis of the return light flux is made incident upon the optical surface 28a substantially at a critical angle of total reflection. In the present embodiment, the return light flux is reflected by the optical surface only once. In order to obtain the same high detection sensitivity as that of the optical head shown in FIG. 1, it is preferable to apply multiple anti-reflection coating layers on the optical surface 28a. The P polarized return light flux is made incident upon the optical surface 28a of prism 28 in such a manner that the incident plane is in the tangential direction X. To this end, the incident plane to the optical surface 28a is crossed with the incident plane to the polarizing film 24 of polarization prism 23 at right angles. Further, in order to suppress the variation of the incident planes due to thermal expansion and compression in accordance with temperature variation, the polarization prism 23 and critical angle prism 28 are coupled with each other to form an integral assembly. In the present embodiment, as shown in FIG. 6 in an enlarged scale, the assembly of the polarization prism 23 and critical angle prism 28 is rotated about an axis O which is parallel with the optical axis of the return light flux impinging upon the optical surface 28a of prism 28.

The objective lens 27 is secured to one end of an arm 30 extending in a direction perpendicular to the optical axis of the objective lens 27. The other end of the arm 30 is connected to an objective lens actuator 31 arranged on an extension of the line connecting the semiconductor laser 21 to the reflection prism 26. The actuator 31 comprises a bobbin 51 (see FIGS. 7A and 7B) around which a focusing coil 32 and radial coils 33 are wound and a shaft 34 which supports the bobbin 51 movably in the optical axis direction of the objective lens 27 and rotatably in a plane perpendicular to the optical axis of the objective lens 27. By generating a magnetic flux perpendicularly to the directions of electric currents flowing through the focus and radial coils 32 and 33, the objective lens 27 can be moved linearly in the optical axis direction of the objective lens 27 and is moved arcuately in the plane perpendicular to the optical axis direction of the objective lens 27 to effect the focusing and tracking servo. In this manner, the in-focused light spot on the optical disc can follow the center of track in the optical disc.

Figure 7A:
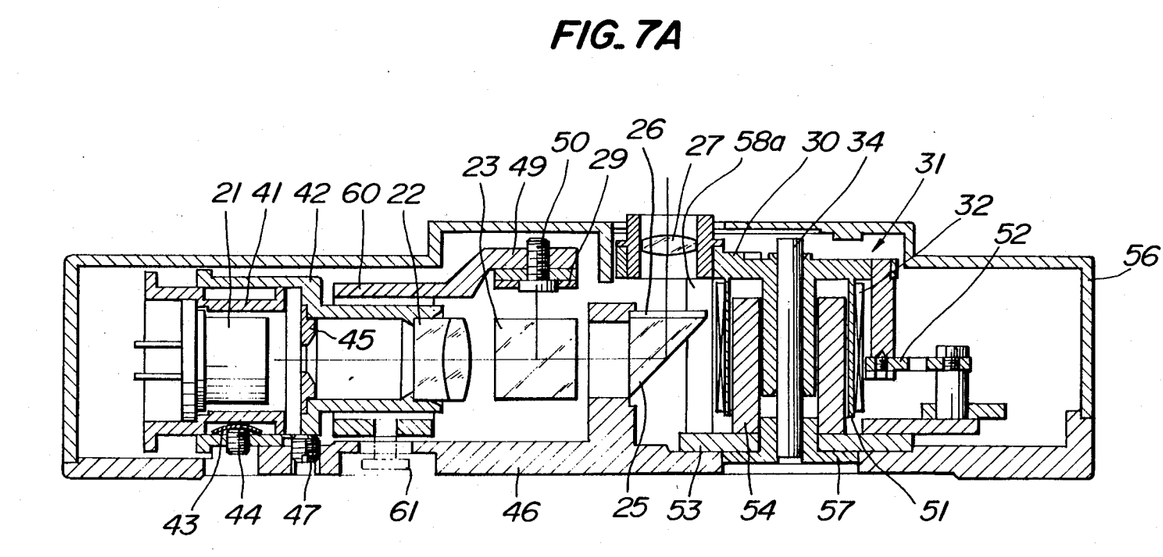
FIGS. 7A and 7B are longitudinal cross sectional views of the optical head according to the invention.
Figure 7B:
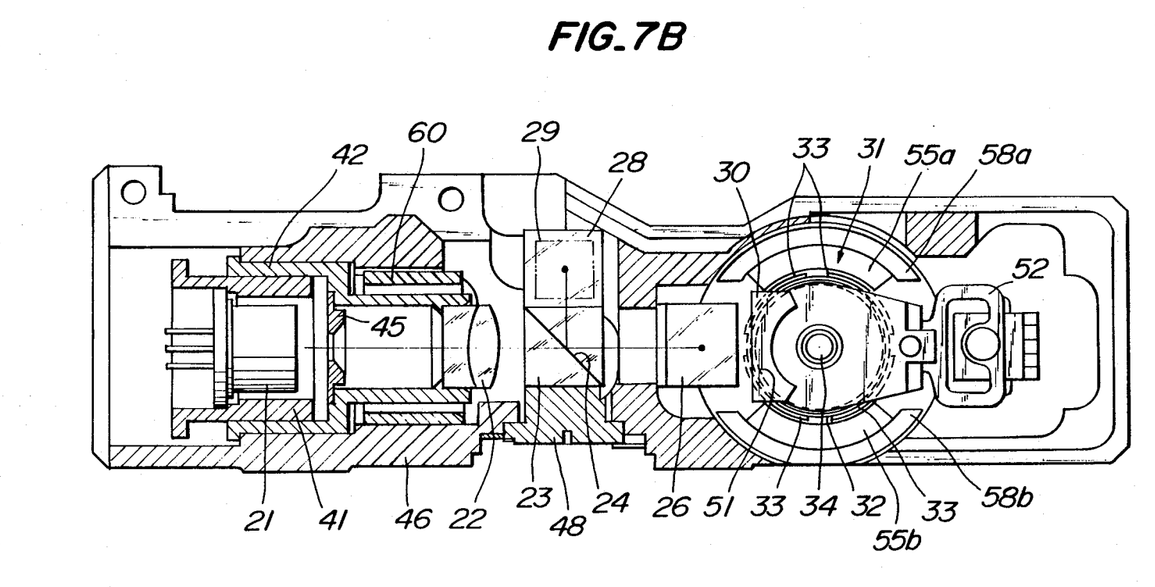
Figure 8A:
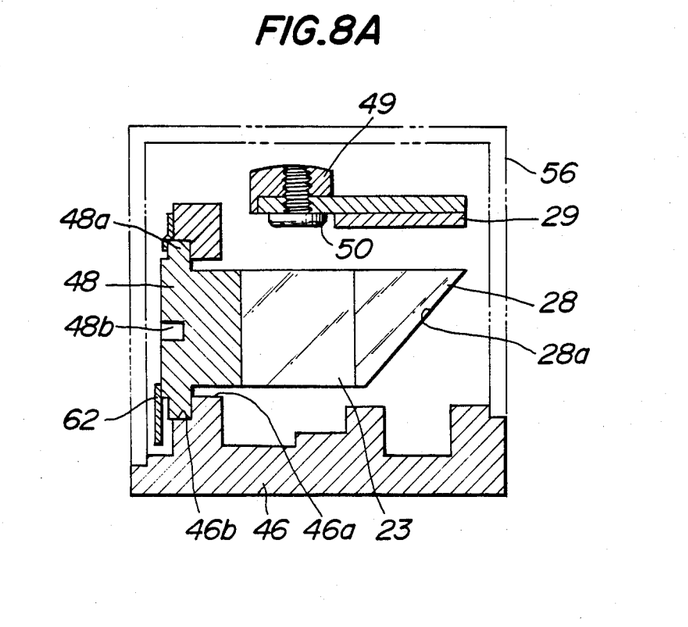
FIGS. 8A and 8B are lateral cross section and plan views showing a portion of the optical head.
Figure 8B:
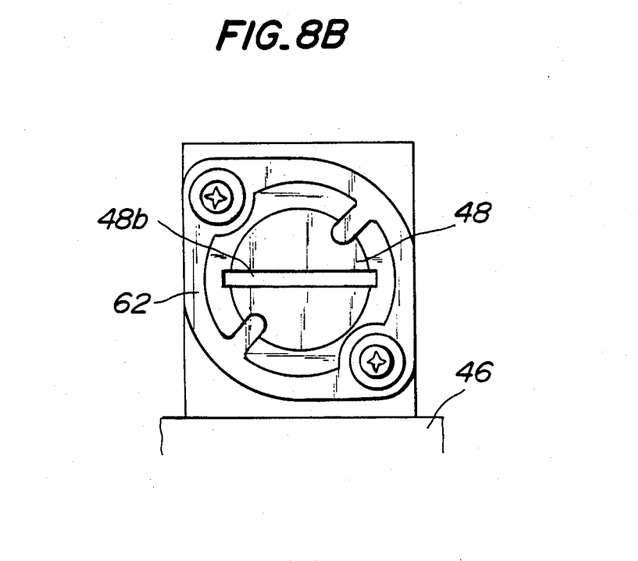

FIGS. 7A and 7B are cross sectional views of the optical head shown in FIG. 5. The semiconductor laser 21 is secured to an inner sleeve 41 which is inserted into an outer sleeve 42 which is movable in the optical axis direction. The inner sleeve 41 is fixed to the outer sleeve 42 by means of a leaf spring 43 and a screw 44. In the outer sleeve 42 are arranged a stop 45 and the collimator lens 22. The outer sleeve 42 is secured to a base plate 46 by means of a screw 47. The assembly of the polarization prism 23 and critical angle prism 28 is secured by cementing them to a stem-like rotating member 48 which is supported by the base plate 46 rotatably about an axis O parallel to the optical axis of the return light flux impinging upon the optical surface 28a so that the incident angle of the optical axis of return light flux to the optical surface 28a of the critical angle prism 28 is set substantially at the critical angle of total reflection. For instance, the incident angle can be precisely set to an angle slightly smaller than the critical angle of total reflection. As best shown in FIGS. 8A and 8B, the rotating member 48 is provided with a flange 48a and the base plate 46 is provided with an opening 46a having a step 46b against which the flange 48a of rotating member 48 is urged by means of a leaf spring 62. In a free end surface of the rotating member 48 is formed a recess 48b. The rotating member 48 can be easily rotated from outside the optical head by inserting a tip of a tool such as a screw driver into the recess 48b.

The reflection prism 25 and quarter wavelength plate 26 are connected to each other by means of adhesive and an assembly of these elements is secured to the base plate 46. The light detector 29 is secured to a holder 49 by means of a screw 50 and the holder 49 is coupled integrally with a ring 60 arranged rotatably around the outer sleeve 42 so that the light detector 29 can be adjusted in the optical axis direction as well as being capable of rotation about the optical axis by means of the handle 61 secured to the ring 60. In this manner, the light detector 29 can be correctly positioned with respect to the critical angle prism 28. A means for fixing the ring 60 to the base plate 46 is not shown for the sake of simplicity.

The bobbin 51, around which the focusing and radial coils 32 and 33 are wound, of the actuator 31 is integrally formed with the arm 30 for supporting the objective lens 27, and the shaft 34 is secured to the base plate 46 by means of a fixing flange 57. The bobbin 51 is inserted into the shaft 34 movably in the longitudinal direction and rotatably about the shaft. The arm 30 and bobbin 51 are supported by the base plate 46 via an elastic member 52 made of resin material. Around the flange 57 is clamped a ring-shaped yoke 53 made of magnetic material and a tubular inner yoke 54 made of magnetic material is arranged inside the bobbin 51 and secured to the yoke 53. Around the bobbin 51 are arranged a pair of outer yokes 58a and 58b made of magnetic material and a pair of permanent magnets 55a and 55b are secured to inner surfaces of the outer yokes 58a and 58b, respectively. The magnets 55a and 55b extend in the direction of the shaft 34 such that the inner surfaces of the magnets 55a and 55b are substantially opposed to the focusing and radial coils 32 and 33. In this manner, it is possible to generate magnetic fluxes passing through the focusing and radial coils 32 and 33. Therefore, by adjusting the direction and amount of electric current passing through the coils 32 and 33, the bobbin 51 and thus the arm 30 can be shifted in the direction of the shaft 34 and can be rotated about the shaft 34. In this manner the objective lens 27 can be driven both in the optical axis direction and in the radial direction to effect the focusing and radial servo control. All parts except for the objective lens 27 are covered with a casing 56. In FIG. 7B, the casing 56 has been removed for the sake of simplicity.

As explained above, in the present embodiment, the polarization prism 23 and critical angle prism 28 are integrally coupled with each other and the assembly of these prisms is supported rotatably about the axis O parallel to the optical axis of the return light flux. Therefore, by rotating the assembly about the axis O, it is possible to adjust the incident angle of the light flux reflected from the optical disc with respect to the optical surface 28a of the critical angle prism 28. In this case, since the polarization prism 23 and critical angle prism 28 are integrally coupled with each other, the angular position of the polarizing film 24 of the polarization prism 23 and the optical surface 28a of the critical angle prism 28 are fixed and therefore, deviations due to temperature variations do not occur. Moreover, since the light beam emitted from the semiconductor laser 21 is transmitted through the polarization prism 23 and the light beam reflected from the optical disc is reflected by the polarization prism 23, even when the assembly of the polarization prism 23 and critical angle prism 28 is rotated, any optical axis except for the optical axis of the light beam impinging upon the critical angle prism 28 is not inclined at all. Therefore, it is possible to effect the angular adjustment of the critical angle prism 28 in an easy and prompt manner without deteriorating the optical properties of the optical head. Further, the precisely adjusted incident angle of the return light beam to the optical surface 28a of the critical angle prism 28 can be maintained for a long time. It should be noted that the variation of the incident angle to the optical surface of the critical angle prism 28 is in proportion to the refractive index of the prism 28.

In the embodiment explained above, since the parts from the semiconductor laser 21 to the reflection prism 25 are aligned linearly and the number of optical surfaces is smaller than that of the optical device shown in FIG. 1, the aberrations of the imaging optical systems can be effectively reduced and thus, the system's optical property is improved. Further, between the objective lens 27 and polarization prism 23 is arranged the reflection prism 25 so as to bend the optical axis at right angles and the reflection prism 25 is arranged beside the objective lens actuator 31. Therefore, the dimension of the optical head measured in the optical axis direction of the objective lens 27 can be made small. Moreover, the polarization prism 23 and critical angle prism 28 are arranged in a crosswise manner and the return light beam is reflected by the critical angle prism only once, the width of the optical head viewed in the disc radial direction can be also made small. That is, since the dimension of the optical head in the disc radial direction is small, the optical head can be moved nearer to the disc center without being interrupted by the driving mechanism for rotating the optical disc and thus, a larger area of the optical disc can be utilized to store the data signal. In this manner, it is possible to provide the compact optical head particularly suitable for use in a compact disc player using a compact disc having a radius of 12 cm.

Figure 9:
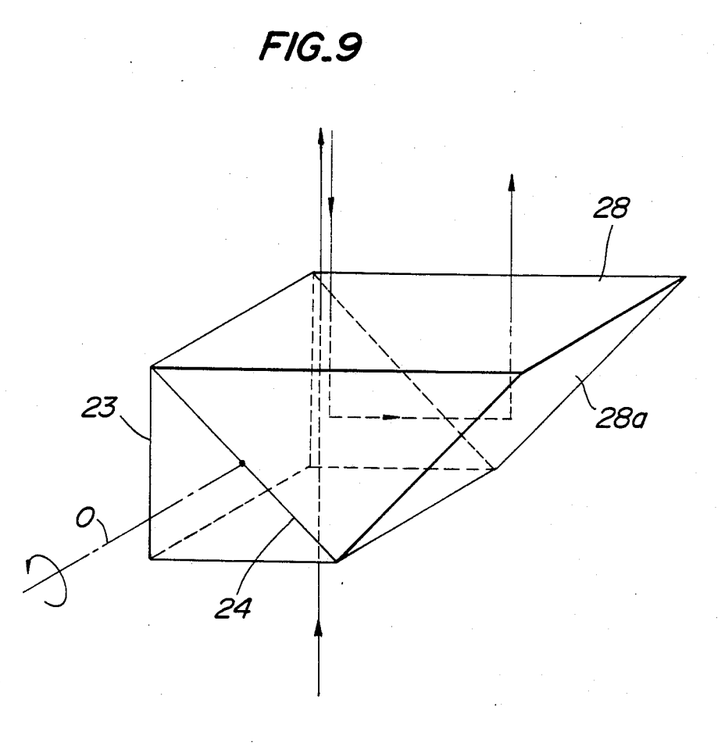
FIG. 9 is a perspective view illustrating a main part of another embodiment of the optical head according to the invention.

It should be noted that the present invention is not limited to the embodiments explained above, but may be modified in various ways. For instance, the polarization prism 23 and critical angle prism 28 can be coupled with each other in such a manner that their incident planes are parallel with each other as illustrated in FIG. 9. In this case, the assembly of the polarization prism 23 and the critical angle prism 28 is rotated about an axis O perpendicular to the incident planes. Further, the incident light beam emitted from the light source may be reflected by the polarization prism and the return light beam from the optical disc may be transmitted through the polarization prism. In this case, if the prism assembly is rotated, not only the optical axis of the return light beam, but also the optical axis of the light beam impinging upon the objective lens are inclined, the optical property of the optical head is deteriorated to some extent, but the other merits of the system are maintained. Moreover, in the above embodiment, the objective lens actuator comprises the sliding type focusing servo and the rotating type radial servo, but use may be made of any other actuator comprising a leaf spring mechanism as long as the actuator has an arm for supporting the objective lens. It should be noted that the polarization prism may be replaced by a half mirror. In this case, the quarter wavelength plate may be omitted. The reflection prism may be also replaced by a reflection mirror.

As explained above, according to the present invention, the polarization prism serving as the beam splitter and the critical angle prism are integrally coupled with each other and the prism assembly is rotated to adjust the incident angle of the return light beam from the optical disc to the optical surface of the critical angle prism in an easy and prompt manner. Further the precisely adjusted incident angle can be kept stable for a long time without being affected by the thermal expansion and compression of the various parts.

What is claimed is:

1. An optical head for reproducing information recorded along at least one information track on a planar optical record medium, comprising:
    a base member extending in a first direction parallel to a plane containing said at least one information track;
    a light source arranged on said base member for emitting a light beam in said first direction;
    a reflecting member arranged on said base member for reflecting said light beam in a second direction substantially perpendicular to said first direction;
    objective lens means having an optical axis parallel to said second direction for projecting said light beam reflected by and reflecting member onto the record medium as a fine spot, for collecting a light flux reflected by the record medium, and for directing the light flux toward said reflecting member;
    electromagnetic driving means arranged on the base member adjacent to said reflecting member for moving said objective lens in said second direction parallel to the optical axis of the objective lens and in a third direction substantially perpendicular to said first and second directions in accordance with a focusing error and a tracking error, respectively;
    an optical member arranged on the base member for directing the light flux reflected by the reflecting member in a fourth direction; and
    light detecting means arranged on the base member for receiving the light flux emanating from said optical member and for deriving a signal representing information recorded on the record medium and signals representing said focussing error and tracking error, respectively.

2. An optical head according to claim 1, wherein said light source, reflecting member, optical member and electromagnetic driving means are aligned in said first direction on the base member.

3. An optical head according to claim 1, wherein said light source comprises a semiconductor laser and said optical member comprises a polarizing film arranged between the semiconductor laser and the reflecting member and a quarter wavelength plate arranged between the polarizing film and the objective lens.

4. An optical head according to claim 3, wherein said polarizing film is inclined with respect to the first direction by 45°.

5. An optical head according to claim 4, wherein said polarizing film is contained in a polarization prism.

6. An optical head according to claim 5, wherein said polarization prism is arranged whereby the light flux reflected by the polarizing film is directed in the fourth direction perpendicular to the first and second directions.

7. An optical head according to claim 6, wherein said light detecting means comprises a prism having an optical surface upon which the light flux reflected by the polarizing film is made incident substantially at a critical angle of total reflection, and a light detector for receiving a light flux reflected by said optical surface.

8. An optical head according to claim 7, wherein said light detector has four light receiving regions divided along two mutually orthogonal lines.

9. An optical head according to claim 1, wherein said reflecting member comprises a triangular prism.

10. An optical head according to claim 1, wherein said electromagnetic driving means comprises:
    a shaft secured to the base member and extending in said second direction,
    a movable member arranged rotatably about said shaft and slidably along said shaft, said objective lens being coupled with said movable member,
    a first coil secured to said movable member drivable with a signal related to said focussing error,
    a second coil secured to said movable member drivable with a signal related to said tracking error, and
    a permanent magnet mounted on the base member for generating a magnetic flux passing through said first and second coils.

11. An optical head according to claim 10, wherein said movable member comprises a bearing portion movably engaged with the shaft, a bobbin portion on which said first and second coils are secured, and an arm portion having an end to which said objective lens is secured.

* * * * *